(12) United States Patent
Wang et al.

(10) Patent No.: US 12,475,547 B2
(45) Date of Patent: Nov. 18, 2025

(54) METHOD FOR ANALYZING MINOR DEFECT BASED ON PROGRESSIVE SEGMENTATION NETWORK

(71) Applicant: Nanjing University of Aeronautics and Astronautics, Nanjing (CN)

(72) Inventors: Jun Wang, Nanjing (CN); Qifan Tu, Nanjing (CN); Dawei Li, Nanjing (CN); Cheng Yi, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 448 days.

(21) Appl. No.: 18/049,202

(22) Filed: Oct. 24, 2022

(65) Prior Publication Data

US 2023/0298152 A1    Sep. 21, 2023

(30) Foreign Application Priority Data

Mar. 16, 2022 (CN) .......................... 202210256643.7

(51) Int. Cl.
*G06T 7/00* (2017.01)
*G06T 7/12* (2017.01)
*G06T 7/194* (2017.01)

(52) U.S. Cl.
CPC .............. *G06T 7/0004* (2013.01); *G06T 7/12* (2017.01); *G06T 7/194* (2017.01)

(58) Field of Classification Search
CPC ......... G06T 7/11; G06T 7/0004; G06T 7/194; G06T 2207/20084
See application file for complete search history.

(56) References Cited

U.S. PATENT DOCUMENTS

2019/0197340 A1* 6/2019 Li ........................... G06T 7/521
2021/0407072 A1* 12/2021 Ben Baruch ........... G06V 20/52
(Continued)

FOREIGN PATENT DOCUMENTS

CN    103630542 B  *  3/2018
CN    108267455 A  *  7/2018   ............. G01N 21/01
(Continued)

OTHER PUBLICATIONS

Li D, Li Y, Xie Q, Wu Y, Yu Z, Wang J. Tiny defect detection in high-resolution aero-engine blade images via a coarse-to-fine framework. IEEE Transactions on Instrumentation and Measurement. Feb. 24, 2021;70:1-2 (Year: 2021).*
(Continued)

*Primary Examiner* — Michael Robert Cammarata

(57) ABSTRACT

The present disclosure provides a method for analyzing a minor defect based on a progressive segmentation network, including: acquiring an original image for a surface of a component, and cropping the original image into a plurality of patches; inputting each of the patches to a minor defect feature extraction network to extract an image feature; classifying the patch into a defective image or a non-defective background image according to an extracted image feature; inputting an extracted image feature of the defective image to a defect segmentation network to obtain a segmentation mask image of a corresponding defect; and quantitatively analyzing the defect according to the segmentation mask image to obtain information such as an area, a length and a width of the defect.

6 Claims, 4 Drawing Sheets

(56) References Cited

U.S. PATENT DOCUMENTS

| | | | |
|---|---|---|---|
| 2022/0092856 A1* | 3/2022 | Wu | G06V 20/17 |
| 2022/0270304 A1* | 8/2022 | Sterkin | G06T 3/40 |
| 2022/0292654 A1* | 9/2022 | Zhang | G06T 7/194 |
| 2023/0360386 A1* | 11/2023 | Chidziva | G06V 10/7715 |
| 2024/0071033 A1* | 2/2024 | Lee | G06V 20/69 |
| 2024/0127455 A1* | 4/2024 | Tang | G06T 7/12 |

FOREIGN PATENT DOCUMENTS

| | | | | |
|---|---|---|---|---|
| CN | 109492569 A | * | 3/2019 | |
| CN | 110441319 A | * | 11/2019 | G01N 21/8851 |
| CN | 113112501 A | * | 7/2021 | G06K 9/6256 |
| CN | 114119466 A | * | 3/2022 | |
| WO | WO-2022121531 A1 | * | 6/2022 | G06K 9/6267 |

OTHER PUBLICATIONS

Ronneberger, et al "U-net: Convolutional networks for biomedical image segmentation." Medical image computing and computer-assisted intervention—MICCAI 2015: 18th int'l conf., Munich, Germany, Oct. 5-9, 2015, proceedings, part III 18. Springer International Publishing, 2015 (Year: 2015).*

* cited by examiner

Perform overlapping cropping on original image data to obtain data of patches

↓

Construct a minor defect feature extraction network, and take the data of the patches as an input extracted image feature

↓

Distinguish a defect localization image and an ineffective background region according to an extracted image feature

↓

Output, for the defect localization image, an accurate detection result of a minor defect by using a defective segmentation network

↓

Quantitatively analyze the defect according to the accurate detection result of the minor defect

FIG. 1

METHOD FOR ANALYZING MINOR DEFECT BASED ON PROGRESSIVE SEGMENTATION NETWORK

CROSS REFERENCE TO RELATED APPLICATION

This patent application claims the benefit and priority of Chinese Patent Application No. 202210256643.7, filed on Mar. 16, 2022, the disclosure of which is incorporated by reference herein in its entirety as part of the present application.

TECHNICAL FIELD

The present disclosure belongs to the technical field of defect detection, and particularly relates to a method for analyzing a minor defect based on a progressive segmentation network.

BACKGROUND ART

In China, equipment manufacturing is considered as a core component of the national industry, a lifeline of the national economy, and an important cornerstone for supporting the comprehensive national power. Large high-end equipment in aviation, aerospace, and navigation is of great significance to the equipment manufacturing, and its production quality directly impacts performance and market competitiveness of final products.

During production and use of components for the large equipment, defects on surfaces of the components are unavoidable due to a production process, a fatigue factor, etc. Through analysis on massive two-dimensional (2D) measurement data, defects on surfaces of components for the large equipment involve multiple types, complicated forms and large scale spans. To ensure the equipment quality, it is important to accurately detect and quantitatively analyze these defects. According to present industrial production practices, the defects are detected qualitatively with manual methods. However, visual detection based on human eyes cannot realize quantitative measurement, with time-consuming and labor-consuming manual detection, a high omission ratio, low efficiency, poor reliability, etc. Moreover, the visual inspection has serious omission to minor defects, which is far from satisfactory to actual quality requirements.

SUMMARY

In view of shortages in the prior art, the present disclosure provides a method for analyzing a minor defect based on a progressive segmentation network. The present disclosure adopts the following technical solutions:

A method for analyzing a minor defect based on a progressive segmentation network includes the following steps:

step S1: acquiring an original image for a surface of a component, and cropping the original image into a plurality of patches having a certain size, so as to subsequently detect and analyze a minor defect.

step S2: inputting each of the patches to a well-trained minor defect feature extraction network to extract an image feature;

step S3: classifying, according to an extracted image feature, the patch into a defective image or a non-defective background image;

step S4: inputting an image feature of the defective image that is extracted by the minor defect feature extraction network to a well-trained defect segmentation network to obtain a segmentation mask image of a corresponding defect; and step S5: quantitatively analyzing the defect according to the segmentation mask image to obtain index information of the corresponding defect, the index information including an area, a length and a width of the defect.

Further, the original image may be cropped into the patches by overlapping cropping in step S1; and if the patches each may have a width of w and a height of h, an overlapping region between two adjacent patches may have a width of w·op and a height of h·op, where op may be an overlapping threshold.

Further, the overlapping threshold may be calculated by:

$$op = \text{Max}\left(\frac{\frac{\delta}{N}\sum_{i \in N}(w_i + h_i)}{W}, \frac{\frac{\delta}{N}\sum_{i \in N}(w_i + h_i)}{H}\right)$$

where, Max(·) function may represent a maximum-seeking operation, W and H may respectively represent a length and a width of the original image, $w_i$ and $h_i$ may respectively represent a length and width of a defective sample, and $\delta$ may be a constraint value and may be calculated according to distance distributions of defective targets in all defective samples:

$$\delta = \frac{\sum_{i \in N}\sqrt{(x_1 - \bar{x})^2 + (y_1 - \bar{y})^2}}{N}$$

$$\bar{x} = \frac{\sum_{i \in N} x_i}{N}, \bar{y} = \frac{\sum_{i \in N} y_i}{N}$$

where, ($x_i$, $y_i$) may represent a center coordinate of a defective target obtained by taking a top left corner of the image as a reference origin, and N may represent a total number of defective samples in a defect dataset.

Further, the minor defect feature extraction network in step S2 may include a residual unit module and a cross-scale feature fusion module; a sampling operation at all feature scales may be completed by a convolutional layer having a greater stride; and in the cross-scale feature fusion module, three types of convolutional layers having convolution kernels of different sizes may be used to extract feature information at different receptive fields from an output feature of the residual unit module.

Further, the minor defect feature extraction network may sequentially include a first residual unit module, the cross-scale feature fusion module and a second residual unit module; the cross-scale feature fusion module may extract feature information at different receptive fields from an output feature of the first residual unit module by using three convolutional branches, specifically, a first branch may only use a convolutional layer having a 1×1 convolution kernel; and a second branch and a third branch may respectively use a convolutional layer having a 3×3 convolution kernel, and a convolutional layer having a 5×5 convolution kernel, and the convolutional layer having the 1×1 convolution kernel may be respectively provided at a head and a tail of each of the second branch and the third branch; features extracted by the three convolutional branches may be fused with the output feature of the first residual unit module to take as an input of the second residue unit module, and an output of the second residual unit module may be taken as a final output of the whole feature extraction network; and the input f(x,y,c) of the second residual unit module may be expressed as:

$$f(x,y,c) = \Sigma_{i \in X, j \in Y, k \in C}[h(x_i,y_j,c_k)\alpha(x_i,y_j,c_k)+\beta(x_i,y_j,c_k)+\gamma(x_i,y_j,c_k)]$$

where, h may be the output feature of the first residual unit module; $\alpha$, $\beta$, and $\gamma$ may respectively represent the features extracted by the first branch, the second branch, and the third branch; x, y, and c may respectively represent indexes in three dimensions, namely a length, a width, and a depth, of a feature information map; and X, Y, and C may respectively represent maximum index values in the three dimensions.

Further, while the receptive fields are kept unchanged, the 5×5 convolution kernel in the third branch may be replaced with two 3×3 cascaded convolution kernels, so as to further reduce a computational cost in feature extraction.

Further, the defect segmentation network in step S4 may include a classification branch, a localization branch and a segmentation branch; the classification branch may be configured to output a classification confidence of the defect; the localization branch may be configured to output position information of the defect; the segmentation branch may be configured to output the segmentation mask image of the defect; and by setting a classification confidence threshold, final position information of the defect and the corresponding segmentation mask image may be screened.

Further, in step S5, a total number of nonzero pixels in the segmentation mask image may be counted, and taken as an area of the corresponding defect; a minimum circumscribed rectangle of a nonzero pixel region in the segmentation mask image may be acquired; and a length and a width of the minimum circumscribed rectangle may be taken as a length and a width of the corresponding defect.

The present disclosure has the following beneficial effects:
(1) The present disclosure performs overlapping segmentation on the original image for a surface of a component by setting an appropriate overlapping threshold, which improves the efficiency and accuracy of the defect detection, while ensuring the integrity of the defect.
(2) The present disclosure classifies cropped images through a deep neural network (DNN), and then only detects and analyzes the defective image, thereby achieving the higher efficiency of the defect detection.

BRIEF DESCRIPTION OF THE DRAWINGS

FIG. 1 is a schematic flow chart according to a method of the present disclosure.

DETAILED DESCRIPTION OF THE EMBODIMENTS

The present disclosure is described in further detail below with reference to the accompanying drawings.

The present disclosure provides a method for analyzing a minor defect based on a progressive segmentation network, which quantitatively analyzes quality indexes of the minor defect based on a deep learning network. The present disclosure accurately detects each minor defect instance by analyzing an output result of the deep learning network, and obtains quality index information such as a length and a width by analyzing a segmentation contour of the minor defect instance.

As shown in FIG. 1, the method for analyzing a minor defect based on a progressive segmentation network mainly includes the following steps:

Step 1: Acquire image data of a minor defect, the data being obtained by a specific acquisition device according to a specific task. Concerning acquired original image data for a surface of a component, a defective target takes a small proportion relative to an area of the image data. As a result, the original image is subjected to overlapping cropping first, and data of patches obtained therefrom are used to subsequently detect the minor defect.

Figure 2:
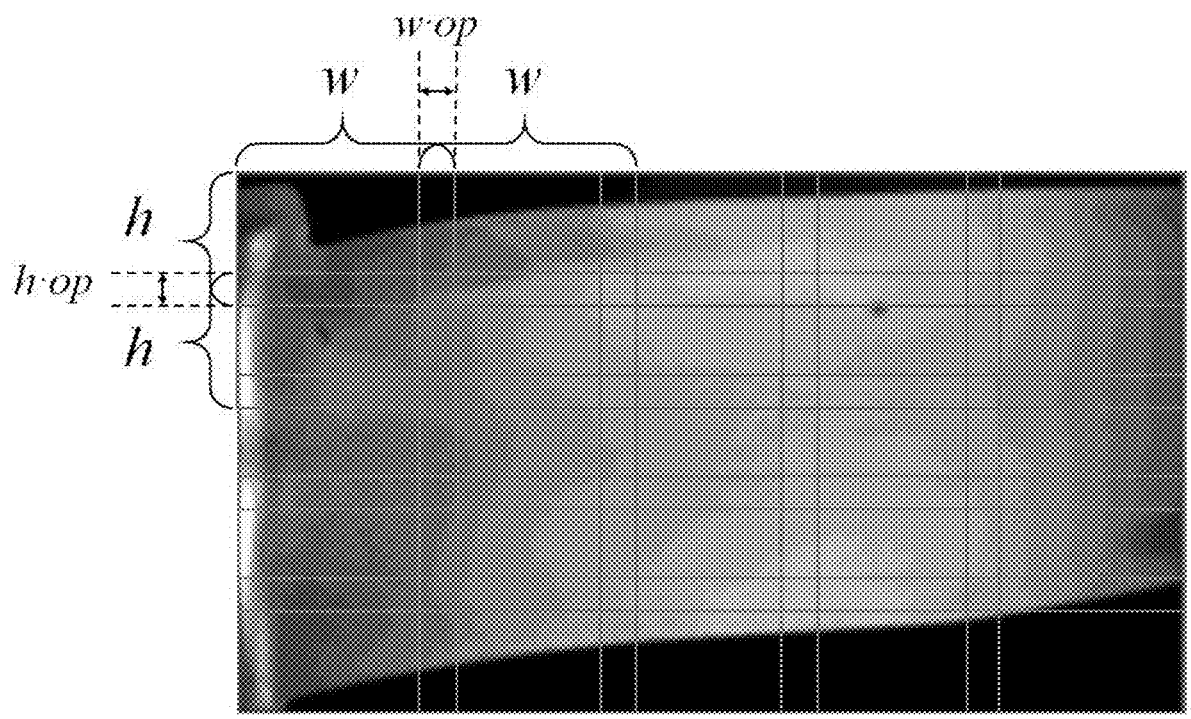
FIG. 2 is a schematic view of overlapping cropping according to a method of the present disclosure.

Specifically, the overlapping cropping is to crop the original image data according to a certain overlapping threshold, so as to ensure integrity of the minor defect in image cropping. The cropping is schematically illustrated in FIG. 2. The overlapping threshold op is calculated by:

$$op = \text{Max}\left(\frac{\frac{\delta}{N}\sum_{i \in N}(w_i + h_i)}{W}, \frac{\frac{\delta}{N}\sum_{i \in N}(w_i + h_i)}{H}\right)$$

where, Max(·) function represents a maximum-seeking operation, W and H respectively represent a length and a width of the original image, N represents a total number of defective samples in a defect dataset, $w_i$ and $h_i$ respectively represent a length and a width of a defective sample in annotation, and $\delta$ is a constraint value and is calculated according distance distributions of defective targets in all samples:

$$\delta = \frac{\sum_{i \in N}\sqrt{(x_1 - \bar{x})^2 + (y_1 - \bar{y})^2}}{N}$$

$$\bar{x} = \frac{\sum_{i \in N} x_i}{N}, \bar{y} = \frac{\sum_{i \in N} y_i}{N}$$

where, $(x_i, y_i)$ represents a center coordinate of a defect in the defective sample obtained by taking a top left corner of the image as a reference origin.

Step 2: Construct a minor defect feature extraction network, input each of cropped defective patches to the network, and extract feature information of the image.

In the embodiment, the minor defect feature extraction network is mainly composed of a residual unit module and a cross-scale feature fusion module. In order to prevent omission of the minor defect in feature extraction, there is no pooling layer in the minor defect feature extraction network, and a sampling operation at all feature scales is completed by a convolutional layer having a greater stride. Particularly, the cross-scale feature fusion module extracts feature information at different receptive fields from an output feature of the residual unit module by using three types of convolutional layers having convolution kernels of different sizes.

Specifically, Step 2 includes:

Step 201: Input data of the patch subjected to the overlapping cropping to the minor defect feature extraction network, and extract a feature of the patch through a first residual unit module, an output image being a half of the original image in feature scale, with an increased number of channels.

Step 202: Connect the cross-scale feature fusion module behind the residual unit module in Step 201 to implement cross-scale fused feature extraction. The cross-scale feature fusion module extracts feature information at different receptive fields from a feature map of the residual unit module by performing convolutional operations, in which a 1×1 convolution kernel, a 3×3 convolution kernel, and a 5×5 convolution kernel are respectively used. For a first branch of the cross-scale feature fusion module, the convolutional layer having the 1×1 convolution kernel is used to process the input feature, which mainly makes the network more nonlinear without increasing a calculated amount, and improves the generalization capability. The convolutional layer having the 1×1 convolution kernel is added at a head and a tail of each of a second branch and a third branch, which reduces a depth of the input feature first, then performs feature extraction, and at last restores a depth of the extracted feature information to the original depth, thereby reducing the calculated amount in the feature extraction. Particularly, for the third branch, when the convolutional layer having the 5×5 convolution kernel is used for the feature extraction, since a larger convolution kernel introduces a larger calculated amount and more parameters, the 5×5 convolution kernel is changed into two cascaded 3×3 convolution kernels while final sizes of the receptive fields are kept unchanged, thereby further reducing the computational cost in the feature extraction. The cross-scale feature fusion module does not change a feature scale of the output image.

Figure 3:
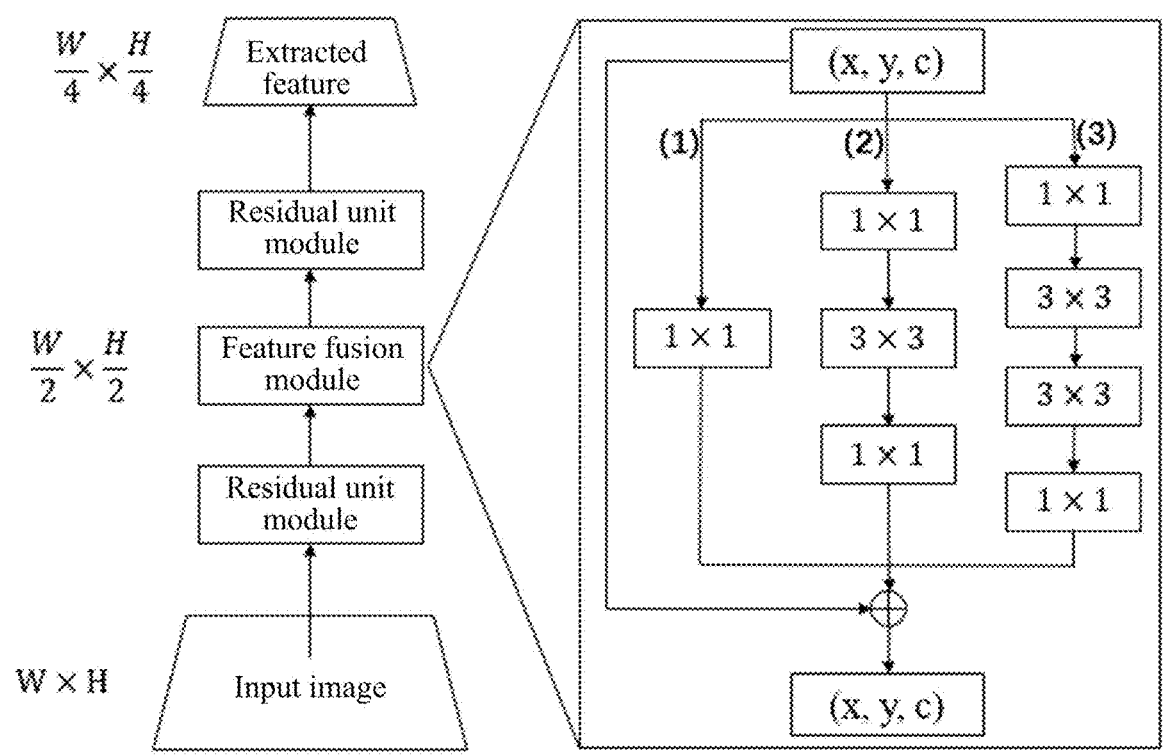
FIG. 3 is a schematic view of a minor defect feature extraction network according to a method of the present disclosure.

The output feature of the cross-scale feature fusion module is a splicing fused result for an original input feature and output features from the three branches at different receptive fields.

$$f(x,y,c)=\Sigma_{i\in X,j\in Y,k\in C}[h(x_i,y_j,c_k)+\alpha(x_i,y_j,c_k)+\beta(x_i,y_j,c_k)+\gamma(x_i,y_j,c_k)]$$

where, h, α, β, and γ respectively represent the original input feature, and feature information maps extracted by the first branch, the second branch, and the third branch; x, y, and c respectively represent indexes in three dimensions, namely a length, a width, and a depth, in each of the feature information maps; and X, Y, and C respectively represent maximum index values in the three dimensions. For more details, see FIG. 3.

Step 203: Further extract, by a residual unit module, an image feature output in Step 202 and subjected to cross-scale feature fusion, a final output image being ¼ of the original image in feature scale, with increased dimensions of channels.

Step 3: Perform binary classification on all input images according to an extracted image feature map, and distinguish a defect localization image and an ineffective background image, thereby realizing rough localization of the minor defect, the defect localization image being taken as input data to detect the minor defect accurately.

Figure 4:
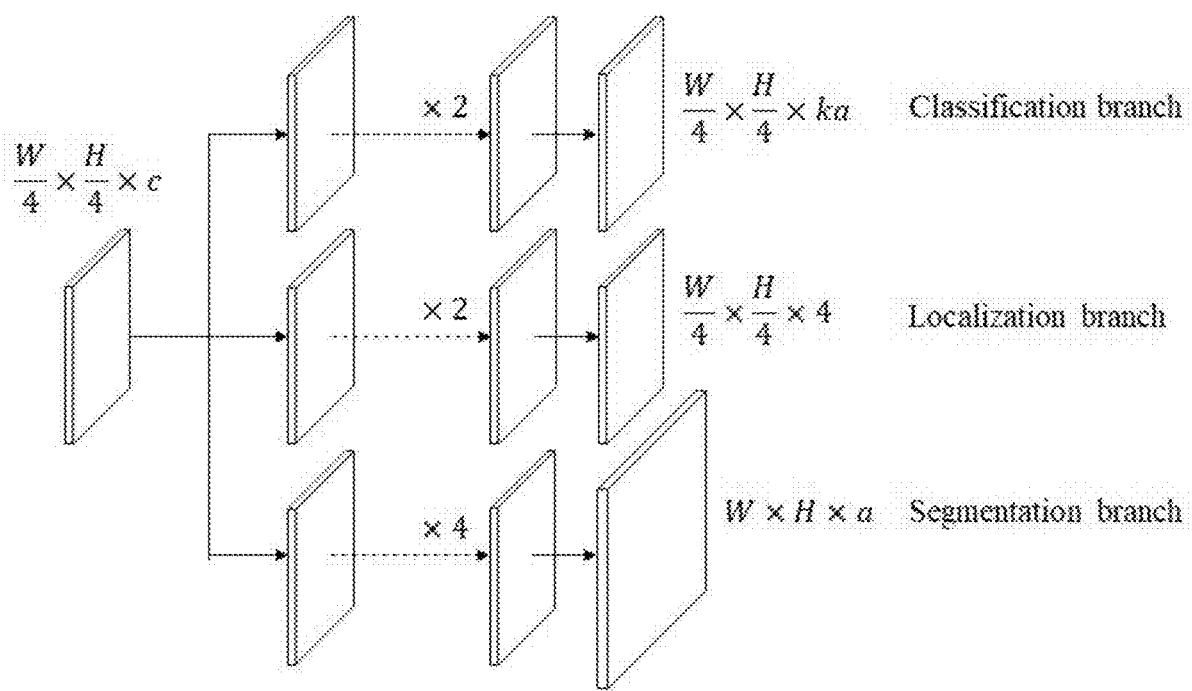
FIG. 4 is a schematic view of a defect segmentation network according to a method of the present disclosure.

Step 4: Obtain an accurate detection result of the minor defect in the defect localization image through a defect segmentation network by using a corresponding image feature extracted in Step 2. The defect segmentation network includes three branches, namely a classification branch, a localization branch and a segmentation branch. The classification branch is configured to output a classification confidence of a to-be-detected defect, at N×K output dimensions, where N represents a number of predicted targets, and K represents a number of defect categories. The localization branch is configured to output a localization error of the to-be-detected defect, at N×4 output dimensions, where N represents the number of predicted targets, and 4 represents a data dimension of a predicted localization error. The segmentation branch is configured to output a segmentation mask of the to-be-detected defect, at w×h×N output dimensions, where W and H respectively represent a length and a width of the segmentation mask, and are the same as the input image in scale, and N represents the number of predicted targets. The final predicted defect instance is screened through a threshold. The structure of the defect segmentation network is illustrated in FIG. 4.

Step 5: Quantitatively analyze the defect according to the accurate detection result of the minor defect output in Step 4, mainly including indexes such as an area, a length, and a width. Specifically, the area of the minor defect can be calculated according to the segmentation mask of the to-be-detected defect output by the segmentation branch in Step 4. The segmentation mask is a w×h matrix having a value of 0 or 1. The value 0 indicates that a pixel of the original image corresponding to the point belongs to a background region. The value 1 indicates that a pixel of the original image corresponding to the point belongs to a to-be-detected defective region. Therefore, the area of the to-be-detected defect can be given by a following equation. Herein, mask represents a segmentation mask matrix, and count 0 represents counting.

$$\text{area}=\text{count}(\text{mask}(i,j)=1, i\in w, j\in h$$

To analyze a length and a width of the to-be-detected defect, a contour of the to-be-detected defect is extracted according to the segmentation mask image, and a minimum circumscribed rectangle of the to-be-detected defect is obtained according to the contour. It is considered that the length of the to-be-detected defect is a longer edge of the minimum circumscribed rectangle, and the width of the to-be-detected defect is a shorter edge of the minimum circumscribed rectangle.

It should be noted that, as used herein, terms such as "upper", "lower", "left", "right", "front" and "back" are merely employed for ease of a description, and not intended to limit the implementable scope of the present disclosure, and a change or adjustment of its relative relation shall also be deemed as falling within the implementable scope of the present disclosure without a substantial alteration of a technical content.

What is claimed is:

1. A method for analyzing a defect based on a progressive segmentation network, comprising the following steps:
    step S1: acquiring an original image for a surface of a component, and cropping the original image into a plurality of patches having a certain size, so as to subsequently detect and analyze a defect;
    step S2: inputting each of the patches to a defect feature extraction network to extract an image feature;
    step S3: classifying, according to an extracted image feature, the patch into a defective image or a non-defective background image;
    step S4: inputting an image feature of the defective image that is extracted by the defect feature extraction network to a defect segmentation network to obtain a segmentation mask image of a corresponding defect; and step S5: quantitatively analyzing the defect according to the segmentation mask image to obtain index information of the corresponding defect, the index information comprising an area, a length and a width of the defect;

wherein the original image is cropped into the patches by overlapping cropping in step S1; and if the patches each have a width of w and a height of h, an overlapping region between two adjacent patches has a width of w·op and a height of h·op, wherein op is an overlapping threshold;

the overlapping threshold is calculated by:

$$op = \text{Max}\left(\frac{\frac{\delta}{N}\sum_{i \in N}(w_i + h_i)}{W}, \frac{\frac{\delta}{N}\sum_{i \in N}(w_i + h_i)}{H}\right);$$

wherein, Max (·) function represents a maximum-seeking operation, W and H respectively represent a length and a width of the original image, $w_i$ and $h_i$ respectively represent a length and width of a defective sample, and δ is a constraint value and is calculated according to distance distributions of defective targets in all defective samples:

$$\delta = \frac{\sum_{i \in N}\sqrt{(x_1 - \bar{x})^2 + (y_1 - \bar{y})^2}}{N}; \text{ and}$$

$$\bar{x} = \frac{\sum_{i \in N} x_i}{N}, \bar{y} = \frac{\sum_{i \in N} y_i}{N};$$

wherein, $(x_i, y_i)$ represents a center coordinate of a defective target in a defective sample relative to a reference origin at a top left corner of the image, and N represents a total number of defective samples in a defect dataset.

2. The method for analyzing a defect based on a progressive segmentation network according to claim 1, wherein the defect feature extraction network in step S2 comprises a residual unit module and a cross-scale feature fusion module; a sampling operation at all feature scales is completed by a convolutional layer; and in the cross-scale feature fusion module, three types of convolutional layers having convolution kernels of different sizes are used to extract feature information at different receptive fields from an output feature of the residual unit module.

3. The method for analyzing a defect based on a progressive segmentation network according to claim 2, wherein the defect feature extraction network sequentially comprises a first residual unit module, the cross-scale feature fusion module and a second residual unit module; the cross-scale feature fusion module extracts feature information at different receptive fields from an output feature of the first residual unit module by using three convolutional branches, specifically, a first branch only uses a convolutional layer having a 1×1 convolution kernel; a second branch and a third branch respectively use a convolutional layer having a 3×3 convolution kernel, and a convolutional layer having a 5×5 convolution kernel, and the convolutional layer having the 1×1 convolution kernel is respectively provided at a head and a tail of each of the second branch and the third branch; features extracted by the three convolutional branches are fused with the output feature of the first residual unit module to take as an input of the second residue unit module, and an output of the second residual unit module is taken as a final output of the whole feature extraction network; and the input f (x,y,c) of the second residual unit module is expressed as:

$$f(x, y, c) = \sum_{i \in X, j \in Y, k \in C} [h(x_i, y_j, c_k) + \alpha(x_i, y_j, c_k) + \beta(x_i, y_j, c_k) + \gamma(x_i, y_j, c_k)],$$

wherein, h is the output feature of the first residual unit module; α, β, and γ respectively represent the features extracted by the first branch, the second branch, and the third branch; x, y, and c respectively represent indexes in three dimensions, namely a length, a width, and a depth, of a feature information map; and X, Y, and C respectively represent maximum index values in the three dimensions.

4. The method for analyzing a defect based on a progressive segmentation network according to claim 3, wherein while the receptive fields are kept unchanged, the 5×5 convolution kernel in the third branch is replaced with two 3×3 cascaded convolution kernels, so as to further reduce a computational cost in feature extraction.

5. The method for analyzing a defect based on a progressive segmentation network according to claim 1, wherein the defect segmentation network in step S4 comprises a classification branch, a localization branch and a segmentation branch; the classification branch is configured to output a classification confidence of the defect; the localization branch is configured to output position information of the defect; the segmentation branch is configured to output the segmentation mask image of the defect; and by setting a classification confidence threshold, final position information of the defect and the corresponding segmentation mask image are screened.

6. The method for analyzing a defect based on a progressive segmentation network according to claim 1, wherein in step S5, a total number of nonzero pixels in the segmentation mask image is counted, and taken as an area of the corresponding defect; a minimum circumscribed rectangle of a nonzero pixel region in the segmentation mask image is acquired; and a length and a width of the minimum circumscribed rectangle are taken as a length and a width of the corresponding defect.

* * * * *